Jan. 29, 1929.
E. D. TILLYER
1,700,656
AUTOMATICALLY OPERATED SCREEN FOR PROJECTION APPARATUS
Filed Oct. 29, 1924
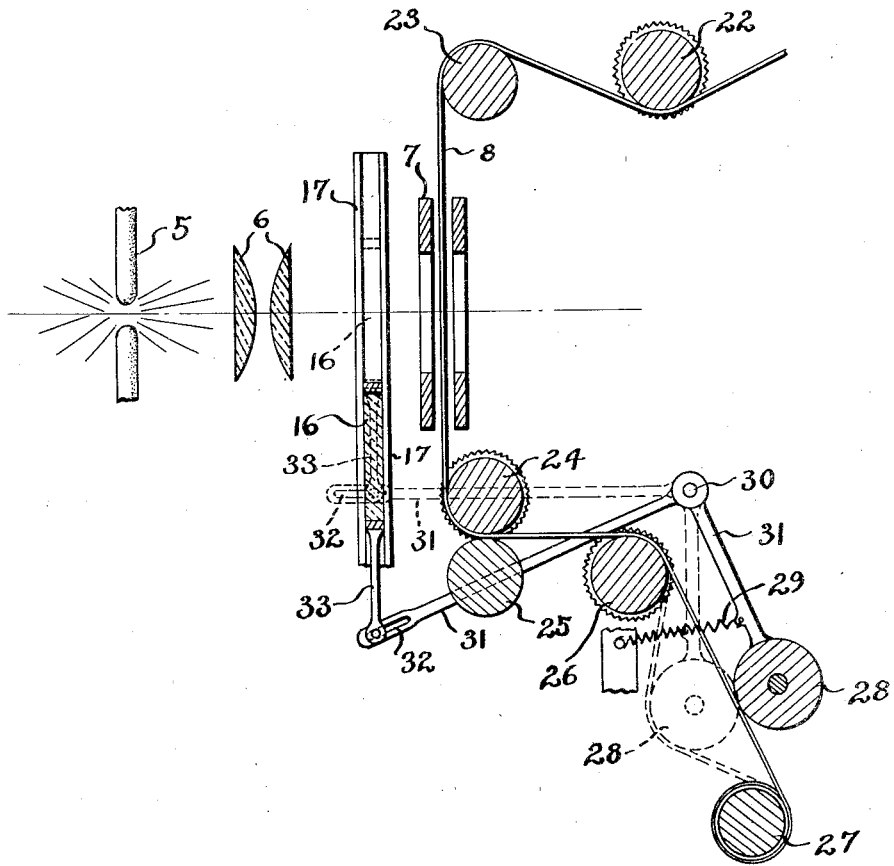
INVENTOR
Edgar D. Tillyer.
BY
Harry H. Styll.
ATTORNEY Patented Jan. 29, 1929.

1,700,656

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

AUTOMATICALLY-OPERATED SCREEN FOR PROJECTION APPARATUS.

Application filed October 29, 1924. Serial No. 746,532.

My invention relates broadly to improvements in illuminating and projecting apparatus, having particular reference to an automatically operated heat protecting screen adapted to be interposed between the source of illumination and the film.

It is a most important object of my invention to provide a transparent heat resisting screen, together with means for automatically interposing this screen between the source of illumination and the film whenever there is danger of the film becoming ignited, either because of the slowing up of the machine or the breaking of the film strip.

A further object of my invention is the provision of such a device, which, while operating automatically and positively to prevent the ignition of the film, will nevertheless permit the projection of light through the film at all times, thus interfering in no way with the projection of the picture.

A still further object of my invention is the provision of such a device which shall be positive in operation, easy to adjust, simple in construction, and most efficient in the performance of its functions.

Other objects and advantages of my invention will become apparent during the course of the following description taken in connection with the accompanying drawings, wherein like numerals are employed to designate corresponding parts throughout all views of the same.

The figure is a semi-diagrammatic longitudinal cross section through a moving picture machine wherein is incorporated a form of my invention.

In the drawings, the numeral 5 designates an arc or similar source of illumination, the rays from which pass through the usual condensing lenses 6 practically all of which are made of crown glass, which is a soda lime silica glass which retards only about .12 of the heat radiations, the aperture in the shield 7, and the film 8.

It has long been known that the heat of the powerful illumination required for motion picture projection constantly endangers the film. Numberless devices have been tried from time to time attempting to eliminate this danger, but so far as I am aware up to the present time there has been no completely satisfactory solution to the problem. Various heat resisting screens have been interposed between the source of illumination and the film, but it would seem as though the disadvantages incident to each of these different screens have more than counterbalanced their efficiency and desired effect. A few of the many attempts to make screens for this purpose have included some of the following devices, but each of these screens has had some outstanding disadvantages: Plain crown glass when used not only cuts down the transmitted illumination in practically the same proportion as it does the heat, but it also cracks as the heat grows more intense. The screen of celluloid is of no use at all, in that it burns almost immediately, while mica, although cutting the heat a slight percentage, also cuts down the amount of transmitted light to such an extent that its use is impractical. Water cells boil when exposed to the heat, giving off bubbles, which are projected on the screen, while glass made to absorb ultra violet rays and then coated with some substance to reflect the infra red rays likewise cracks when used as a screen in this connection.

It has been attempted to construct a screen using an infra red absorbing or reflecting glass and to incorporate this screen into a revolving shutter and through revolution keep it cooled below the cracking point, but even this has been more or less unsuccessful due to the amount of light rays absorbed by these screens and the difficulty of keeping them cooled sufficiently.

And so it is the custom to date, in so far as I am aware, to run the film of a motion picture machine at a predetermined speed, such that the film has no chance of becoming ignited, and to further provide each machine with automatic devices for dropping a shutter over the aperture in the shield 7 when the speed falls below the prescribed minimum to prevent ignition of the film. But even in this device, as in each of the other devices proposed, there are several outstanding disadvantages, chief among which is the fact that the screen being usually metallic and always opaque, completely shuts off all of the projected light, making it impossible to project pictures at a slower speed than the above mentioned prescribed minimum, or to stop the machine, as is often desired to inspect a single feature for any length of time.

And so it is the purpose of my invention to provide a transparent heat resisting screen, this screen to be normally out of the field of projection of the rays of light, whereby it affects in no way the normal projecting of the pictures, but associating this screen with automatically operated means by which it is immediately interposed between the source of light and the film, either upon the breaking of the film or the slowing of the speed of the machine below the prescribed minimum. In this way I am able to obtain, during the normal operation of the machine, the full power of my light system uninterrupted and undiminished by light wasting screens, and during the slow running of the machine or the inspecting of a single picture for any length of time, or during the repairing of the film after a break, still be supplied with light for projection purposes, diminished only by the slight reflecting power of my transparent screen. Thus I overcome the disadvantage of plunging the theatre into darkness upon the breaking of the film, in addition to making possible the projection of my film at any speed desired.

I accomplish my purpose by constructing a screen 16 having the following characteristics: a low coefficient of expansion, or high heat conductivity, with a combination of both, a high transmission of illumination or visible rays, and a selective retardance of the invisible rays, particularly the heat rays. I obtain these characteristics by making my glass of the following material: for the low coefficient of expansion and high heat conductivity property, I may use a media of fused quartz or media high in silica, such as the commercial product known as Pyrex glass. I have found that a screen made of this material will stand an intense heat without cracking. This material also has a high transmission of the illumination or visible rays.

With the heat rays I have my choice of either reflection or absorption. Should I desire to reflect them I coat the screen with a thin film of gold; if to absorb them I introduce ferrous iron into the mixture from which the screen is made, inasmuch as both media have a high transmission of the visible rays. If also I desire to prevent the transmission of ultra violet rays, I introduce into the media materials having the property of absorbing the ultra violet rays, such as cerium salts, carbon, or other metal salts, as found in the commercial optical glasses known as Crookes and Noviol, amber, etc. In any event, it is most essential that I provide a screen having each of the following characteristics in a high degree, low expansion or high heat conductivity to prevent cracking when heated, a high transmission of illumination in order that the screen may be used if desired when projecting a single picture, and either a selective retardance or repulsion of the invisible rays, particularly the heat rays.

In the drawing I have shown a semi-diagrammatic longitudinal cross section through a motion picture projecting machine with mechanism for interposing the screen 16 upon the breaking of the film 8. In this view the numeral 5 represents any source of illumination, in this case an arc, the light rays from which are condensed by the lenses 6, pass on through the aperture in the shield 7, through the pictures on the film, and are projected by projecting lenses, not shown, onto a screen, also not shown. Tracing the course of the film 8, it comes from a reel, not shown, passes around a gear feeding roller 22, over guide 23, past shield 7, between an intermittently rotated feeding roller 24 and a guide 25, over another feeder 26 to a winding reel 27. Steadied by and vertically slidable in guide 17 and in a plane between and parallel to the planes of the condensing lenses 6 and the shield 7, is my screen 16. Resting lightly against the film 8 at a point between the feed roller 26 and the winding reel 27, is a roller 28 tending to swing inwardly to the position shown in dotted lines in the drawing, due to the tension of the spring 29, but held out by the tension of the film 8. Pivoted as at 30, in any suitable bearing, is a rigid right angled lever arm 31, one end of which is rigidly fastened to the roller 28, and the other end of which extends over to a point directly beneath the screen 16, the said latter end being provided with a longitudinally extending slot 32. Slidably mounted in the slot 32, and supporting screen 16, is a supporting arm 33 adapted to raise and lower said screen 16 according to the relative positions of roller 28.

The operation of this mechanism for interposing the screen 16 between the light source 5 and the film 8 upon the breaking of the film, is as follows: In the normal operation of the machine the roller 28 is held in position shown by solid lines in the drawing, by the tension of the film 8 and against the tension of the spring 29. In this position it may readily be seen that the screen 16 is supported below and substantially out of the path of the projected light. Upon the breaking of the film, however, the roller 28 is drawn by the spring 29 to the position shown by dotted lines in the drawing, shifting the lever arm 31 about its pivot 30, and thus raising screen 16 into the path of the light by means of the supporting arm 32. It will thus be obvious that upon the breaking of the film the screen 16 will immediately be interposed between the light source 5 and the film 8, protecting the film from being ignited, without cutting off the projection of light through the system and, therefore, without having the startling effect of throwing the entire room in which the pictures are being projected into darkness.

From the foregoing description it will be seen that I have provided, in a motion picture projecting machine, an automatically operated screen adapted to be thrown into use whenever necessary.

It will also be seen that I have provided means whereby during the normal operation of the machine there will be no loss of transmitted light by the interpositioning of wasteful heat screens, and yet whereby immediately upon the arising of a need for such a screen automatic means will operate to place the screen in a position to positively protect the film.

It will further be seen that I have eliminated the startling effect of having the entire projected light cut off upon the breaking of the film. This embodiment of my invention is broadly illustrative and it is to be understood that I reserve the right to make departures therefrom in so far as I remain within the spirit of my invention and the scope of the appended claims.

I claim:

1. In a device of the character described in combination with image control means including an image bearing member, a source of light adapted to project the image from the image bearing member, a screen adapted to transmit light and to retard heat sufficient to prevent the image bearing member from igniting and movable in a single plane transverse to the light rays into and out of line of the light, a member secured to the screen and extending outwardly therefrom in the plane thereof, a second member pivoted to the first member, and pivotally supported by a pivot removed from the first pivot, and means on one of said members engaging the image control means.

2. In a device of the character described in combination with image control means including an image bearing member, a source of light adapted to project the image from the image bearing member, a screen adapted to transmit light and to retard heat sufficient to prevent the image bearing member from igniting and movable in a single plane transverse to the line of light into and out of the line of light, a lever arm secured to the screen and extending outwardly therefrom in the plane thereof and a bell crank lever having an arm pivoted to the arm on the screen, and means on one of said levers engaging the image control means.

3. In a device of the character described in combination with image control means including an image bearing member, a source of light adapted to project the image on the image bearing member, a screen adapted to transmit light and to retard heat sufficient to prevent the image bearing member from igniting and movable in a vertical plane transverse to the line of light into and out of the line of light, a lever arm secured to the screen and extending outwardly therefrom in the plane thereof, a bell crank lever having an arm pivoted to the lever arm on the screen and a free arm and means on one of said levers engaging the image control means whereby the screen is raised in the vertical plane to be interposed between the light and the image bearing member through movement of the free arm of the bell crank lever.

EDGAR D. TILLYER.